United States Patent [19]
Harvey

[11] Patent Number: 6,029,888
[45] Date of Patent: Feb. 29, 2000

[54] CARD READER

[75] Inventor: Duncan R. Harvey, Dundee, United Kingdom

[73] Assignee: NCR Corporation, Dayton, Ohio

[21] Appl. No.: 09/114,090

[22] Filed: Jul. 10, 1998

[30] Foreign Application Priority Data

Oct. 25, 1997 [GB] United Kingdom .................... 9722551

[51] Int. Cl.[7] .................................................. G06F 17/60
[52] U.S. Cl. ............................................. 235/379; 235/380
[58] Field of Search ..................................... 235/379, 380

[56] References Cited

U.S. PATENT DOCUMENTS 4,602,351 7/1986 Shimamura et al. .
5,434,395 7/1995 Storck et al. ............................ 235/380

FOREIGN PATENT DOCUMENTS 2304220 3/1997 United Kingdom .

*Primary Examiner*—Harold I. Pitts

[57] ABSTRACT

A smart card reading apparatus (16) for use in a self-service terminal (10) where a user of the terminal wishes to transfer funds between an account stored on a first smart card (28) and an account stored on a second smart card (56). The first card is inserted via a card slot (18) into the card reading apparatus inside which the card is held in a first pair of guides (30,32). These are then moved so that a second pair of guides (52,54) can be positioned to receive the second smart card inserted into the card reading apparatus via the same slot (18). Contact blocks (120,136) are positioned to make contact with the two cards so that the transfer of funds can be implemented.

10 Claims, 13 Drawing Sheets

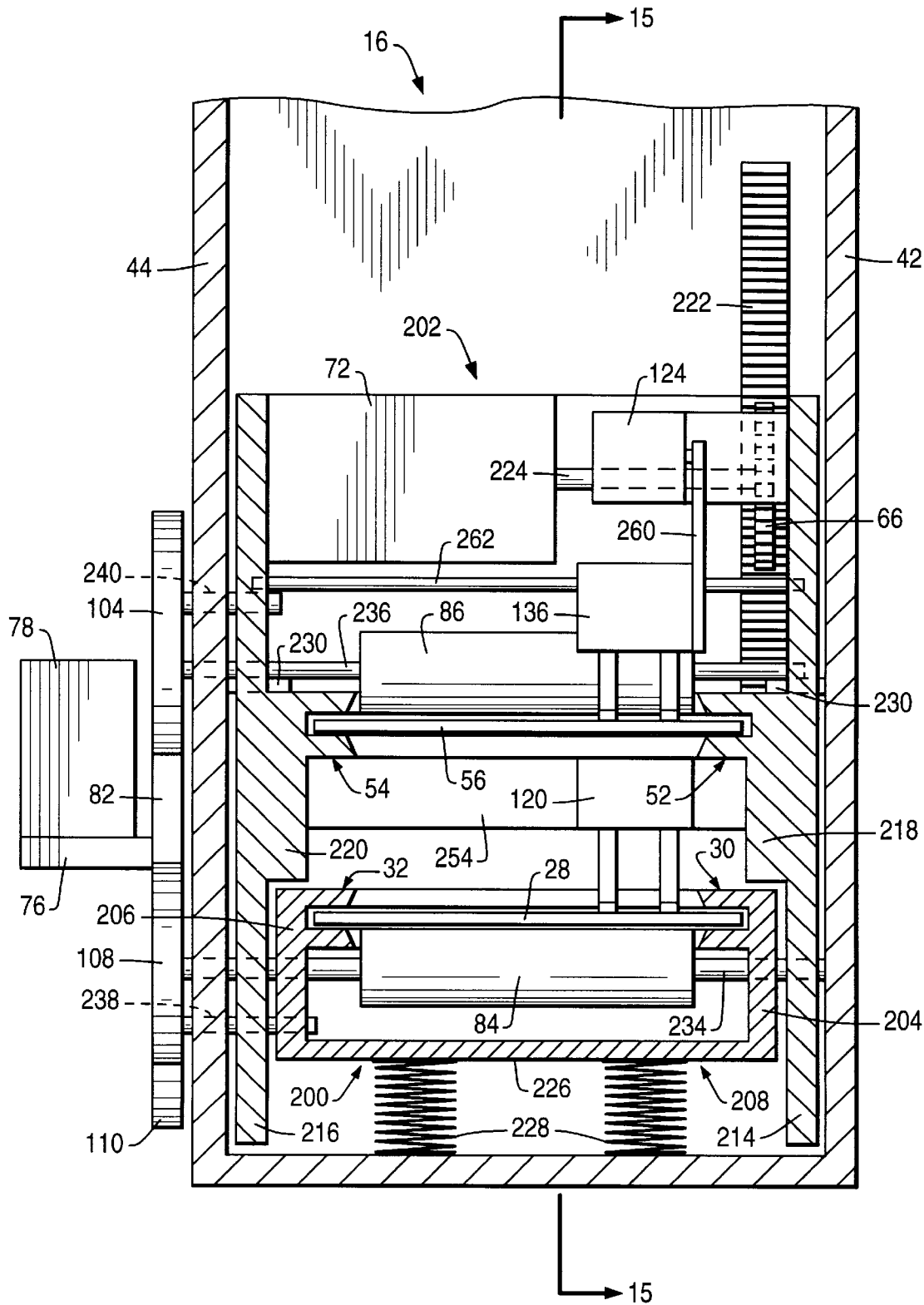

6,029,888

CARD READER

BACKGROUND OF THE INVENTION

The present invention relates to an apparatus for reading smart cards.

It is known for smart cards to be used as an electronic purse where the smart card stores a monetary value. If purchases are made using such a card, the values of the purchases are deducted from the value stored on the card. It is therefore necessary to have a device to transfer funds from a second account to the smart card in order to increase the value of the account held on the card. This second account may also be stored on a smart card.

SUMMARY OF THE INVENTION

It is an object of the present invention to provide an apparatus for transferring information between two smart cards.

According to the present invention there is provided a card reading apparatus for receiving first and second information carrying cards, characterized in that said apparatus includes a single card entry slot for receiving said first and second cards in succession; movably mounted first and second card guides for respectively receiving said first and second cards and for holding said cards in said first and second card reading positions; control means for moving said first guide into alignment with said card entry slot whereby said first card can be fed into the first card reading position, and for moving said second guide into alignment with said card entry slot whereby said second card can be fed into the second card reading position; first and second read/write means respectively arranged to be cooperatively associated with said first and second cards when said cards are in their reading positions; and data processing means connected to said first and second read/write means whereby information can be transferred between said first and second cards.

BRIEF DESCRIPTION OF THE DRAWINGS

Embodiments of the present invention will now be described by way of example with reference to the accompanying drawings, in which:

FIGS. 15 and 16 are sectional views similar to FIGS. 9 and 10 except that the card reading apparatus is shown in a position to receive a second card.

DETAILED DESCRIPTION

Figure 1:
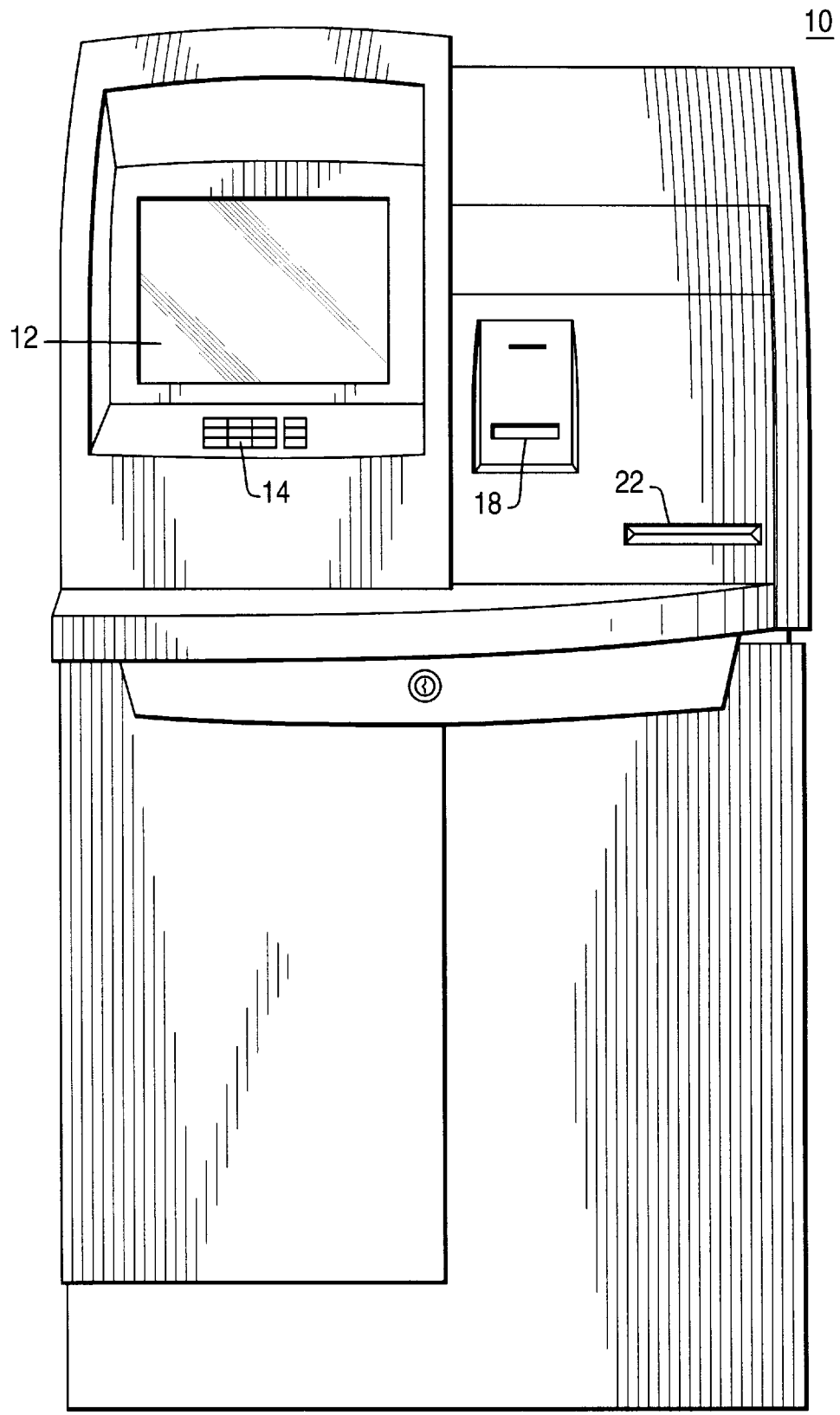
FIG. 1 is a perspective view of a self-service terminal.
Figure 2:
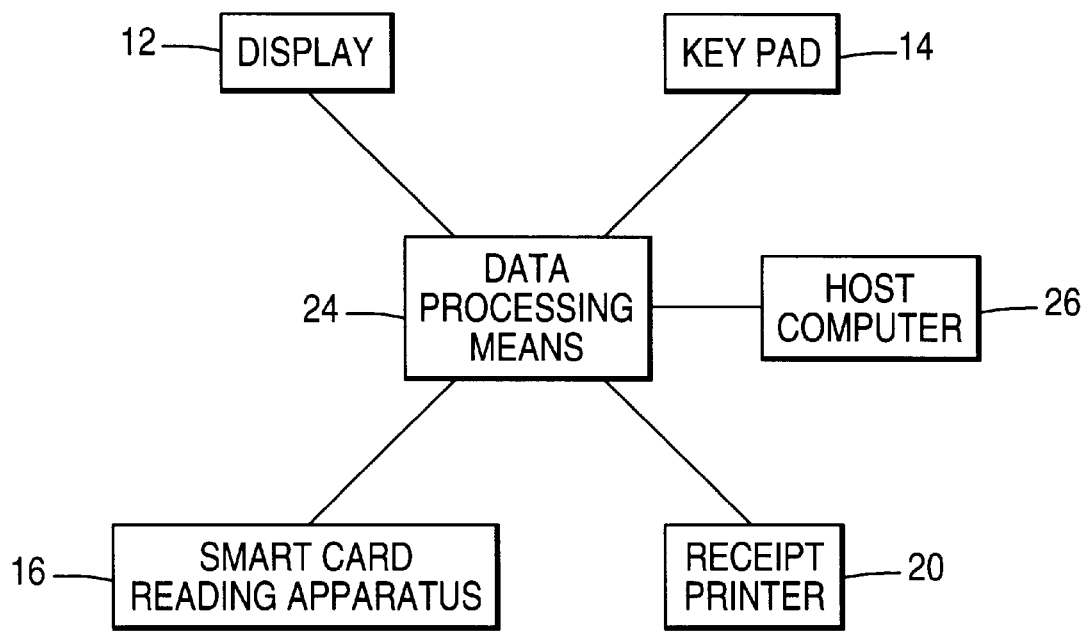
FIG. 2 is a block diagram of the terminal of FIG. 1.

Referring to FIGS. 1 and 2, the self-service terminal 10 shown therein includes a display 12 for displaying user information, a key pad 14 for inputting data, a smart card reading apparatus 16 for receiving a smart card via a card slot 18, a receipt printer 20 for printing a receipt acknowledging a transfer of funds made by a user and for issuing the receipt to the user via a slot 22, and data processing means 24 to which the display 12, the key pad 14, the card reading apparatus 16 and the receipt printer 20 are connected.

The terminal 10 is used to transfer funds between accounts stored on two separate smart cards. For this to happen both cards need to be on-line during the transfer of funds.

To transfer funds from an account stored on a first smart card to an account stored on a second smart card, a user initially inserts his first smart card in the card slot 18 of the terminal 10. The second smart card is then inserted in the card slot 18. Each card has user identification information stored on it. This information is read by the smart card reading apparatus 16 and is transmitted by data processing means 24 to a host computer 26. After both cards have been inserted the user enters the relevant personal identity number associated with each card. If the host computer 26 authorizes both cards then the user enters details of the transfer by means of the key pad 14. The data processing means 24 then subtracts the value of the transfer from the account stored on the first card and adds it to the account stored on the second card. How the card reading apparatus 16 accepts both cards inserted in the slot 18 will be described in more detail in the two embodiments below.

Referring to FIGS. 3 to 7, the first embodiment of the smart card reading apparatus 16 is shown.

Figure 3:
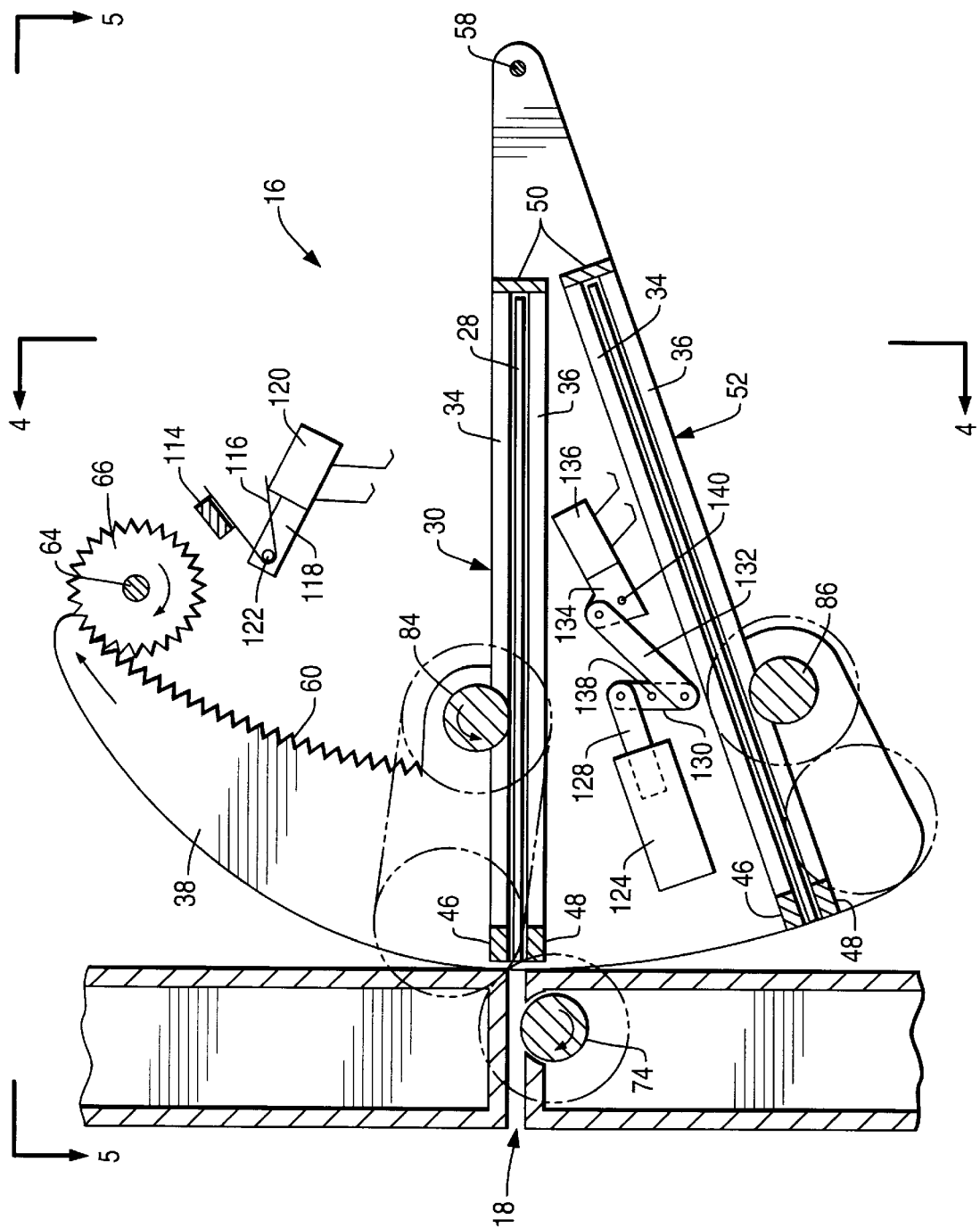
FIGS. 3 to 6 are sectional views of a first embodiment of a card reading apparatus according to the invention included in the terminal of FIG. 1 wherein the card reading apparatus is shown in a position to receive a first card.

Referring to FIG. 3 (and also FIGS. 4 and 5), a smart card 28 inserted into the apparatus 16 is held by a pair of horizontally-spaced card guides 30,32. Note that smart card 28 has been omitted from FIG. 5 for clarity. Each guide 30,32 comprises two flanges 34,36 which are parallel and closely spaced vertically so that a side edge of the card 28 can be inserted between them. Guides 30,32 are connected to respective vertical members 38,40 where these members 38,40 are adjacent walls 42,44 which form the outer walls of the card reading apparatus 16. The guides 30,32 are connected to one another by end-spans 46,48,50. A pair of spans 46,48 are at the end of the card guides 30,32 that receive the card 28, where one span 46 connects the two top flanges 34 of the guides 30,32 and the other span 48 connects the two bottom flanges 36 of the guides 30,32. A third span 50 acts as a stop at the other end of the guides 30,32.

Figure 7:
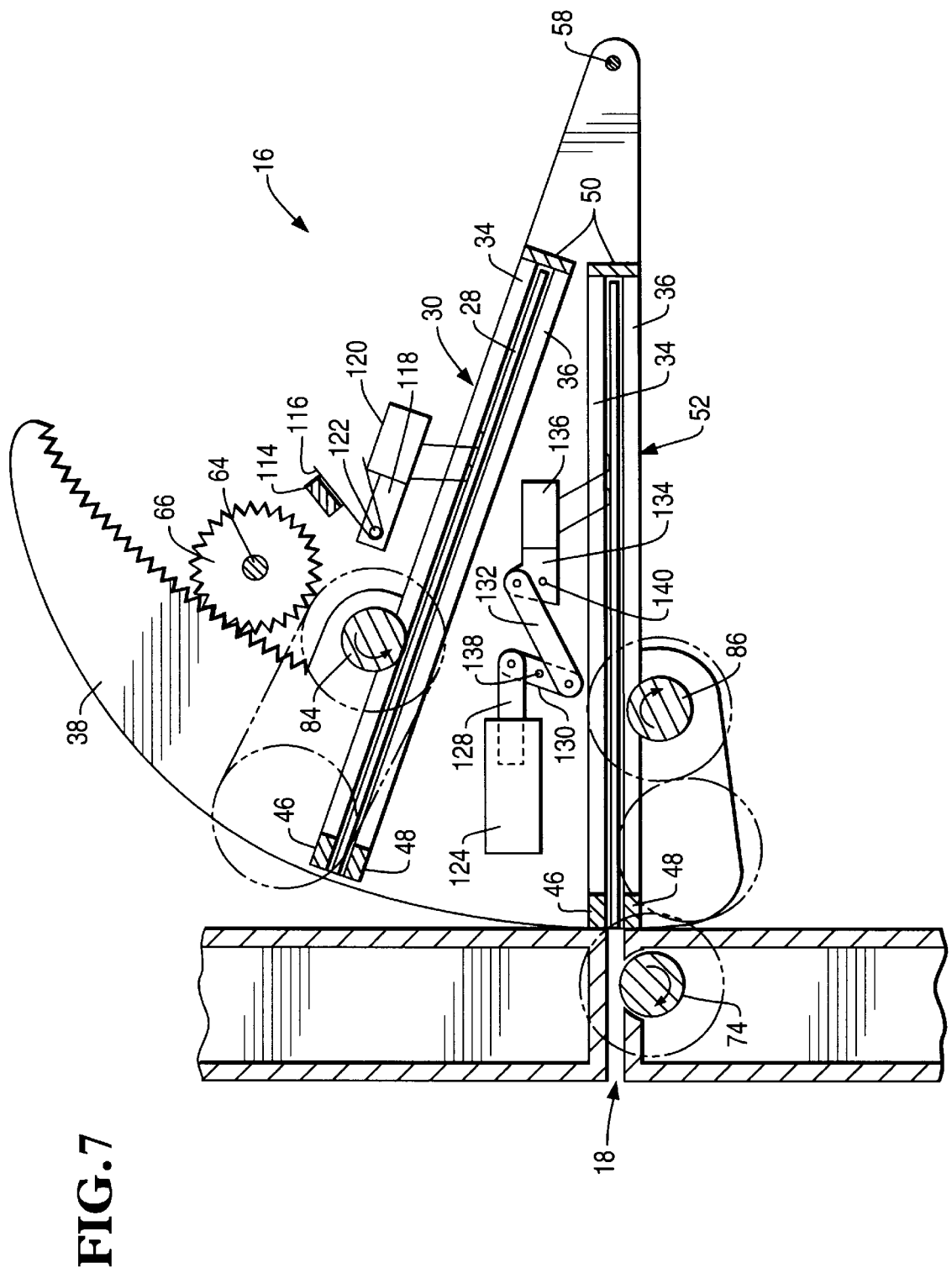
FIG. 7 is a sectional view similar to FIG. 3 except that the card reading apparatus is shown in a position to receive a second card.

A second pair of guides 52,54, identical to the first pair of guides 30,32, is used to hold a second smart card 56 (FIG. 7 shows card 56). The guides 52,54 are connected to each other by spans 46,48,50. The second pair of guides 52,54 is located below the first pair 30,32 and is at an acute angle in the vertical plane to the first pair. The two pairs of guides 30,32,52,54 are at their closest point to one another at the end at which each of them has the span 50 that acts as a stop. Guides 52,54 are also connected to respective vertical members 38,40. The vertical members 38,40 extend past the two stop spans 50. Through these extensions passes a shaft 58 that is supported at either end by the walls 42,44. It is about this shaft 58 that the card reading apparatus 16 can rotate. This is clearly illustrated in FIG. 3.

FIG. 3 shows that vertical member 38 has a curved rack 60 along one of its edges. Vertical member 40 has a identical rack 62. A shaft 64, supported by the walls 42,44, has a pair of cog wheels 66,68 that engage with the curved racks 60,62. A platform 70 (see FIG. 4) that cantilevers out of wall 42 on the opposite side to the card reading apparatus 16 supports a motor 72 that can drive the shaft 64 and cog wheels 66,68. This motor 72 is under the control of the data processing means 24 (see FIG. 2).

Figure 4:
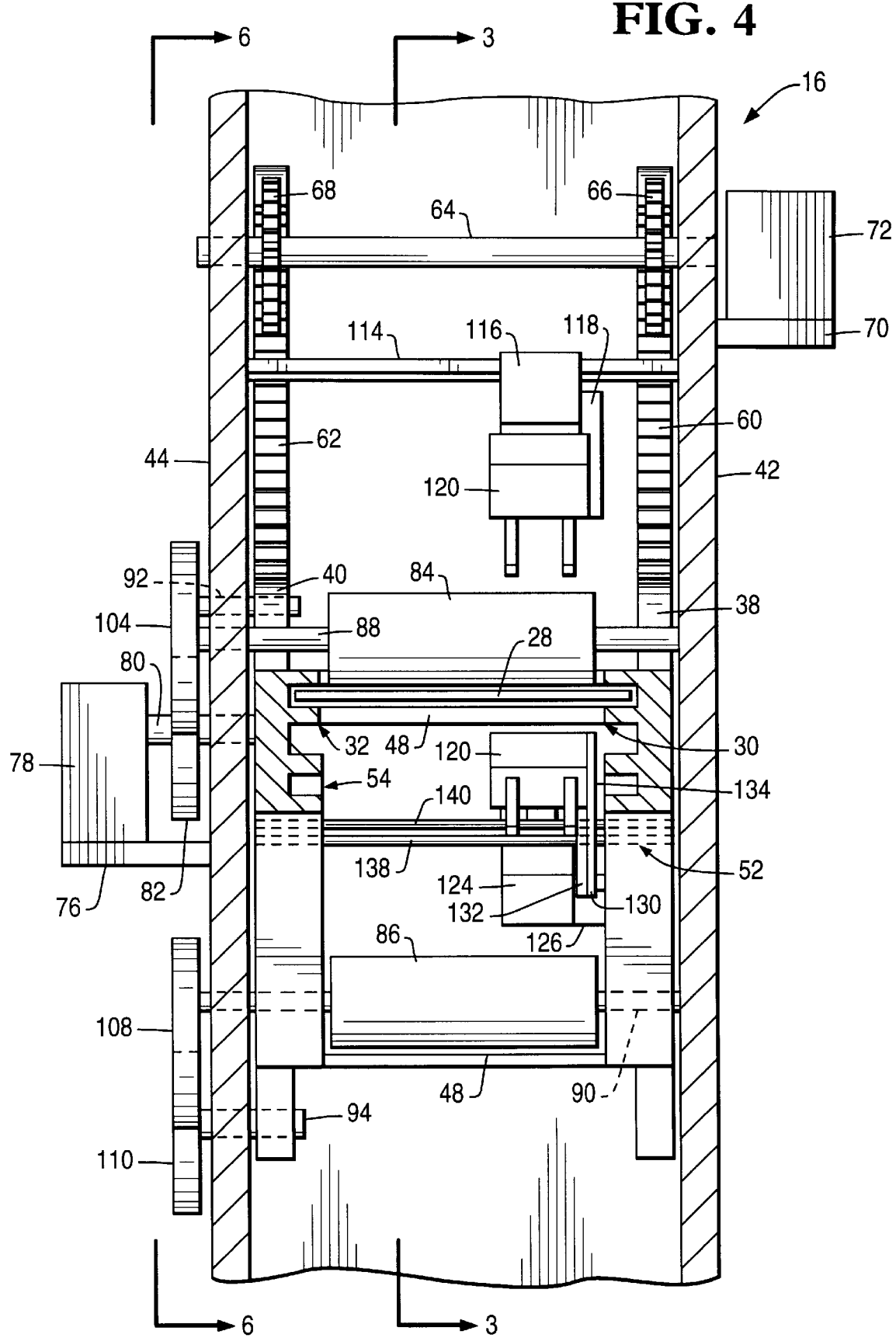
Figure 5:
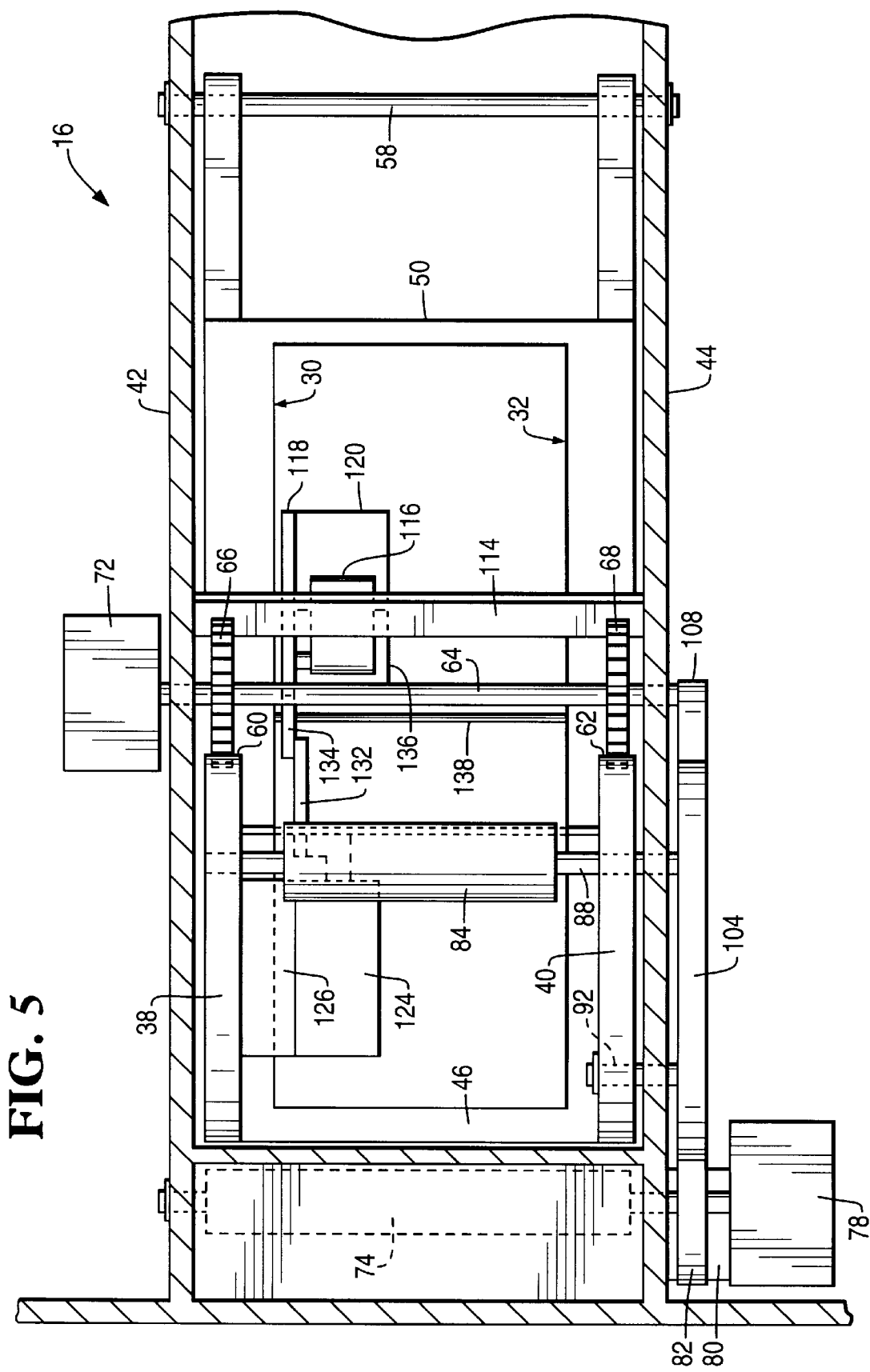

Just inside the card entry slot 18 is located a roller 74 that is used to transport a card to the card reading apparatus 16. Referring to FIG. 4, a platform 76 that cantilevers out of wall 44 on the opposite side to the card reading apparatus 16 supports a motor 78 that rotates the roller 74 (see FIG. 3) via a shaft 80. This motor 78 is under the control of the data processing means 24. Also mounted on the shaft 80 between the wall 44 and motor 78 is a wheel 82 (see also FIG. 6).

As can be most easily seen from FIG. 3, between the top flanges 34 of the first pair of guides 30,32 is the base of a roller 84. Between the bottom flanges 36 of the second pair of guides 52,54 is the top of a roller 86.

Referring to FIG. 4, roller 84 is on a shaft 88 and roller 86 is on a shaft 90 where both shafts are supported by the vertical members 38,40 of the card reading apparatus 16. Also passing through wall 44 are shafts 92 and 94, both of which are supported by the vertical member 40. These shafts 92,94 are between the shafts 88,90 of the respective rollers 84,86, and the shaft 80 of roller 74.

Figure 6:
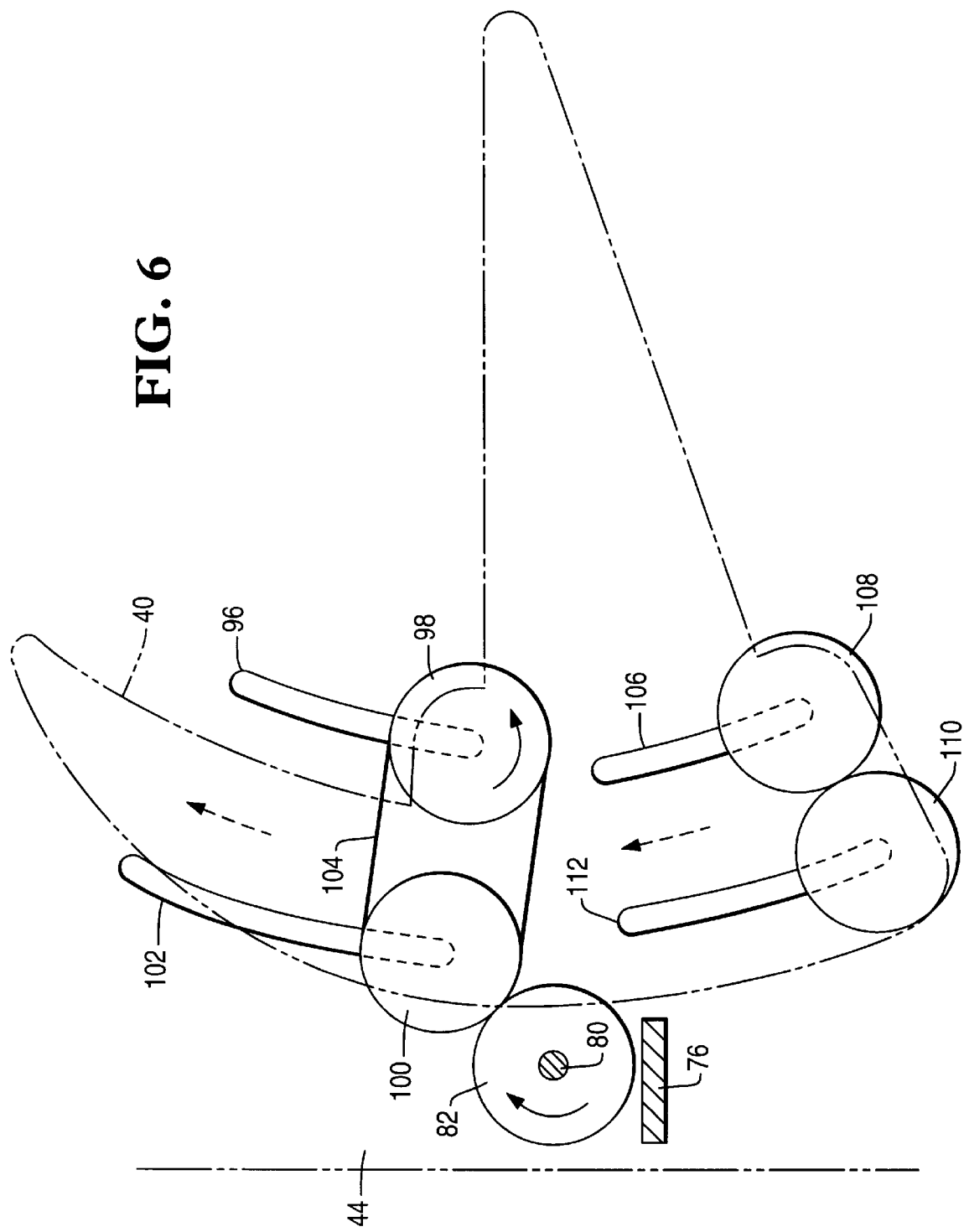

As will be seen most clearly from FIG. 6 (where all shafts have been omitted for clarity), there is a slot 96 in wall 44 through which one end of shaft 88 passes through. At the end of the shaft 88 is mounted wheel 98. At the end of shaft 92 is mounted wheel 100 where shaft 92 passes through wall 44 via another slot 102. Wheel 100 is connected to wheel 98 by a belt 104.

There is also a slot 106 in wall 44 through which one end of shaft 90 passes through. At the end of the shaft 90 is mounted wheel 108. At the end of shaft 94 is mounted wheel 110 where shaft 94 passes through wall 44 via another slot 112. Wheel 110 is adjacent wheel 108.

Slots 96,102,106,112 are curved. This allows the shafts 88,92,90,94 of the respective wheels 98,100,108,110 and hence the card reading apparatus 16 to be moved between the two card receiving positions.

When the card reading apparatus 16 (see FIG. 3) is in a position to receive the first card 28, wheel 100 makes contact with wheel 82. Thus when wheel 82 and roller 74 rotate, belt 104 causes wheel 98 to rotate hence causing roller 84 (see FIG. 3) associated with the first pair of guides 30,32 to rotate in the same direction and at the same speed as roller 74. When the card reading apparatus 16 is in a position to receive the second card 56 (see FIG. 7), wheel 110 makes contact with wheel 82. Thus when wheel 82 and roller 74 rotate, wheel 110 causes wheel 108 to rotate hence causing roller 86 (see FIG. 7) associated with the second pair of guides 52,54 to rotate in the same direction and at the same speed as roller 74.

Wheels 96,102,108,110 are all of the same diameter as wheel 82 rotated by motor 78, and are all of a greater diameter than the rollers 74,84,86. In FIGS. 3 to 5 and FIG. 7, wheels 82,96,102,108,110 and belt 104 are shown in chain dot to aid clarity in understanding how motor 78 is used to drive rollers 84,86.

As will be seen most clearly from FIG. 3, above the first pair of guides 30,32 is mounted a member 114 spanning the two walls 42,44. Fixed to this member 114 is a hinged spring 116. An arm 118 connects a contact block 120 (to be described in more detail later) to the hinge 122 of the spring 116. One of the top edges of the contact block 120 is attached to the underside of the hinged spring 116.

Between the two pairs of guides 30,32,52,54 is a solenoid 124. This is fixed to the vertical member 38 via a connecting member 126 (see FIGS. 4 and 5). The arm 128 of the solenoid 124 is connected via arms 130,132,134 to a contact block 136 (identical to contact block 120) where arms 130,134 rotate around shafts 138,140 that span the two vertical members 38,40.

Figure 8:
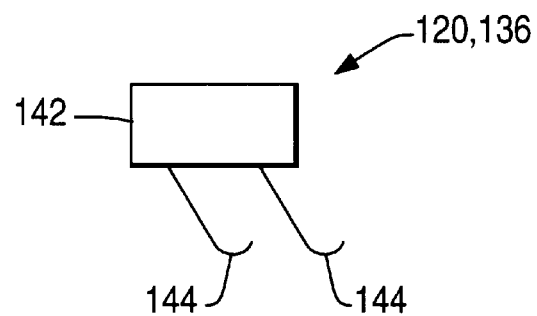
FIG. 8 is a sectional view of a contact block as used in the card reading apparatus of both embodiments.

Referring to FIG. 8, a contact block 120,136 comprises a member 142 to which are connected a pair of springs 144. Information on an inserted card can be accessed when the springs 144 of a contact block 120,136 make contact with the card. Connections between the contact block 120,136 and the data processing means 24 have been omitted for clarity.

FIGS. 3 to 6 shows the card reading apparatus 16 in its initial position. As will be seen most clearly from FIG. 3, a card 28 inserted in slot 18 is transported by rollers 74,84 into the first pair of guides 30,32.

Once the card 28 has been transported into the guides 30,32 the card reading apparatus 16 is rotated clockwise about shaft 58 so that the second pair of guides 52,54 line up with the card insert slot 18 to receive a second card 56 as shown in FIG. 7. The rotation of the apparatus 16 is caused by motor 72 rotating the cog wheels 66,68 that engage the racks 60,62 on the vertical members 38,40 of the apparatus 16.

When the card reading apparatus 16 is rotated upwards the first inserted card 28 is pressed against the springs 144 (see FIG. 8) of the contact block 120 connected to the hinged spring 116. This causes a firm contact to be made.

The second card 56 is then inserted into slot 18 and is transported by rollers 74,86 into the second pair of guides 52,54.

Once the second card 56 has been received into the second pair of guides 52,54, solenoid 124 is activated causing contact block 136 to be lowered so that its springs 144 make contact with the card 56.

The two smart cards 28,56 are now correctly positioned in the card reading apparatus 16 with the contact blocks 120,136 linking the two cards 28,56 together via the data processing means 24. Thus the transfer of funds from the first card 28 to the second card 56 can now take place.

Once the transfer is complete the solenoid 124 is deactivated causing contact block 136 to be raised back to its original position and the second smart card 56 is returned by the rollers 74,86 to the user. The card reading apparatus 16 is rotated back to its original position as shown in FIG. 3 and the first smart card 28 is returned by the rollers 74,84 to the user.

Referring to FIGS. 9 to 16, the second embodiment of the smart card reading apparatus 16 is shown. This is similar to the first embodiment except that the rotatable card reading apparatus 16 in the first embodiment is replaced by first and second card receiving units 200,202, each of which can be moved vertically. Parts corresponding to those described in the first embodiment have been given the same reference numbers.

Figure 9:
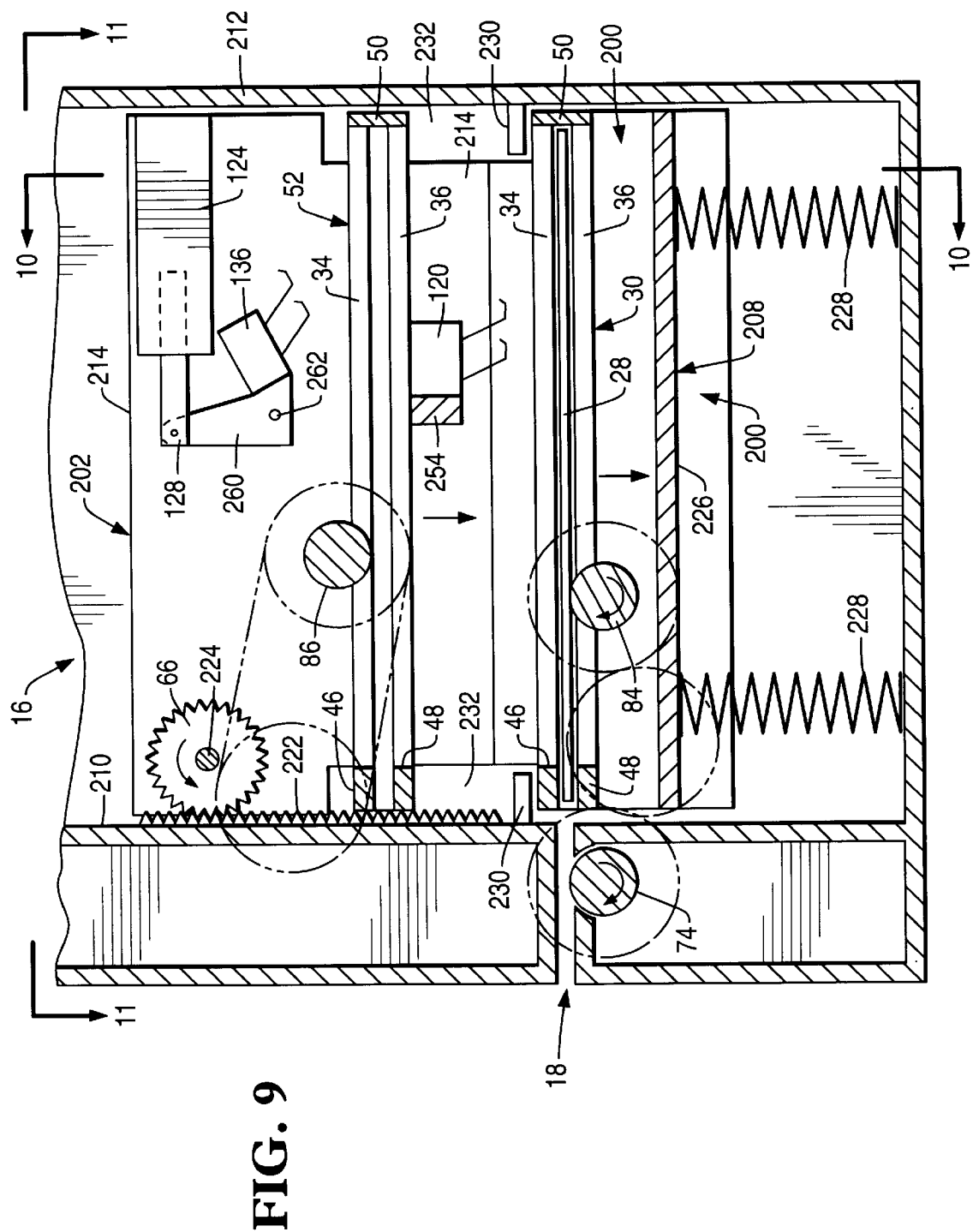
FIGS. 9 to 11 are sectional views of a second embodiment of a card reading apparatus according to the invention included in the terminal of FIG. 1 wherein the card reading apparatus is shown in a position to receive a first card.

Referring to FIG. 9 (and also to FIGS. 10 and 11), a smart card 28 inserted into a first card receiving unit 200 is held by a pair of horizontally-spaced card guides 30,32. Note that smart card 28 has been omitted from FIG. 11 for clarity. The guides 30,32 are connected to the side members 204,206 of a U-shaped tray 208.

Figure 15:
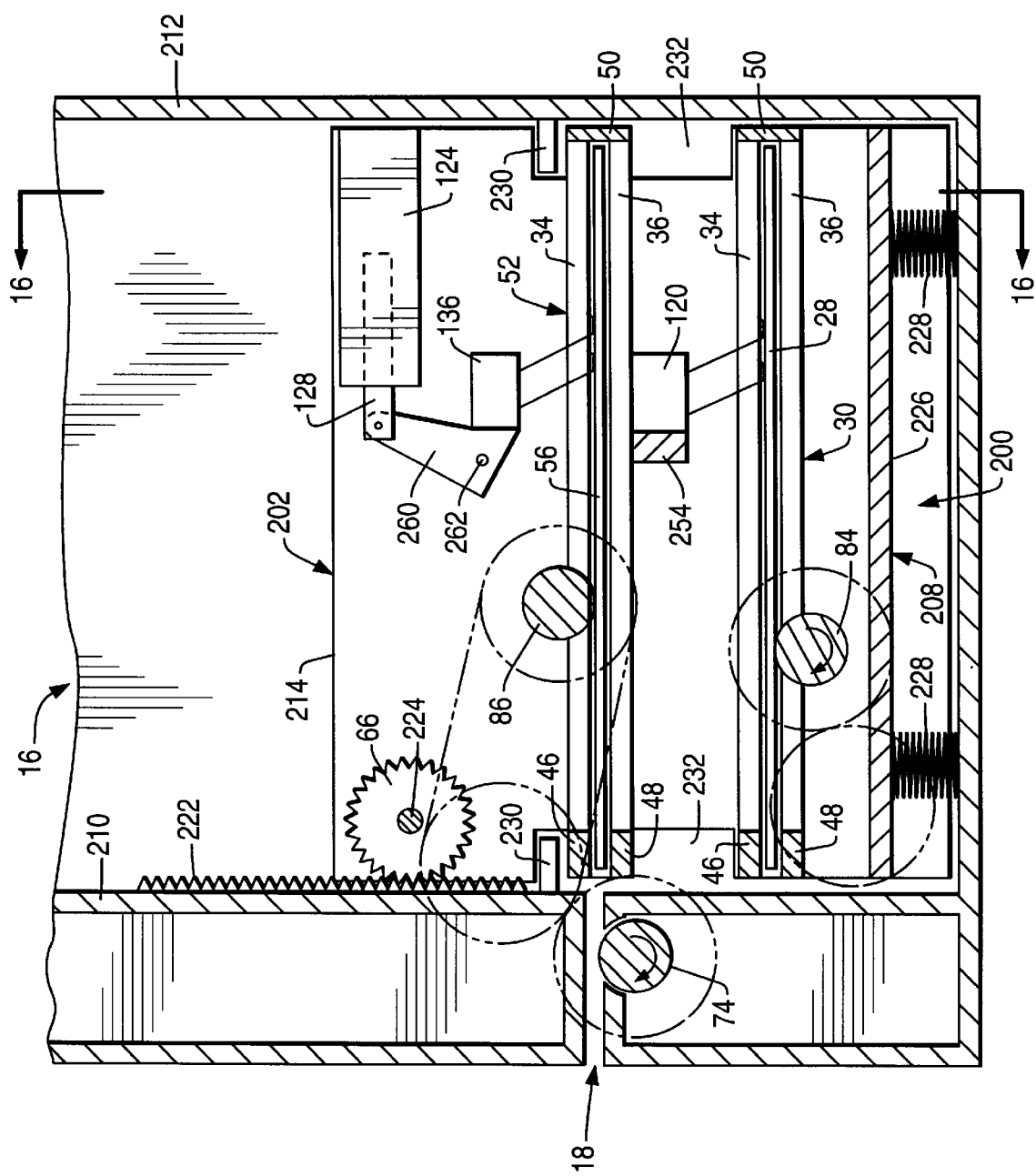

Between the side members 204,206 of the U-shaped tray 208 and two walls 42,44 of the four walls 42,44,210,212 that contain the card reading apparatus 16 are two vertical members 214,216 of the second card receiving unit 202. Connected to the vertical members 214,216 by means of protrusions 218,220 are a second pair of guides 52,54 to hold a second smart card 56 (FIGS. 15 and 16 show card 56). The protrusions 218,220 align the second pair of guides 52,54 directly above the first pair of guides 30,32. On wall 210 is mounted a vertical rack 222. Between the two vertical members 214,216 of the second card receiving unit 202 is a cog wheel 66 on a shaft 224 that can be rotated by a motor 72 (see FIG. 10). The cog wheel 66 engages with the vertical rack 222. The motor 72 is under the control of the data processing means 24.

Figure 12:
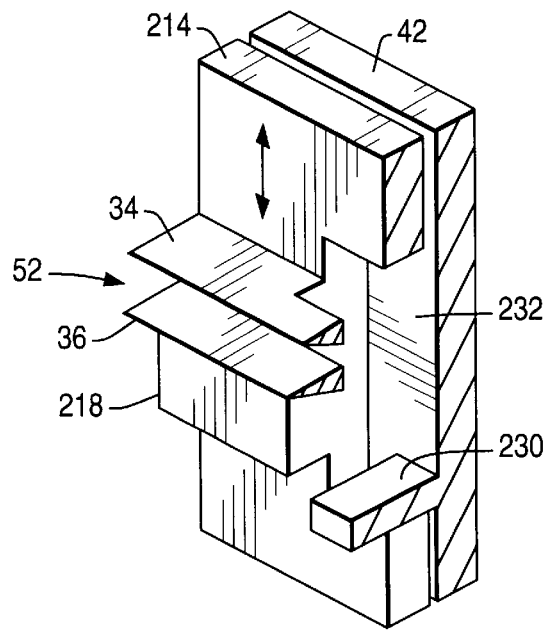
FIG. 12 is an isometric detail of a part of FIG. 11.

The first card receiving unit 200 has on the base 226 of its U-shaped tray 208 four helical springs 228. The springs 228 force the unit 200 upwards into contact with a protrusion 230 in each of the four corners between the four walls 42,44, 210,212 surrounding the card reading apparatus 16 so that the first pair of guides 30,32 are thus aligned with card slot 18. Since these protrusions 230 would block the movement of the second card receiving unit 202 indentations 232 have been made in either end of the vertical members 214,216 of the second card receiving unit 202 to allow movement past the protrusions 230. An isometric detail of a protrusion 230 and part of the second card receiving unit 202 is illustrated in FIG. 12. The first card receiving unit 200 has been omitted for clarity.

As can be most easily seen from FIG. 9, roller 74 is used to transport a card from the card slot 18 to the card reading apparatus 16. Between the bottom flanges 36 of the first pair of guides 30,32 is the top of roller 84. Between the top flanges 34 of the second pair of guides 52,54 is the bottom of roller 86.

Figure 10:
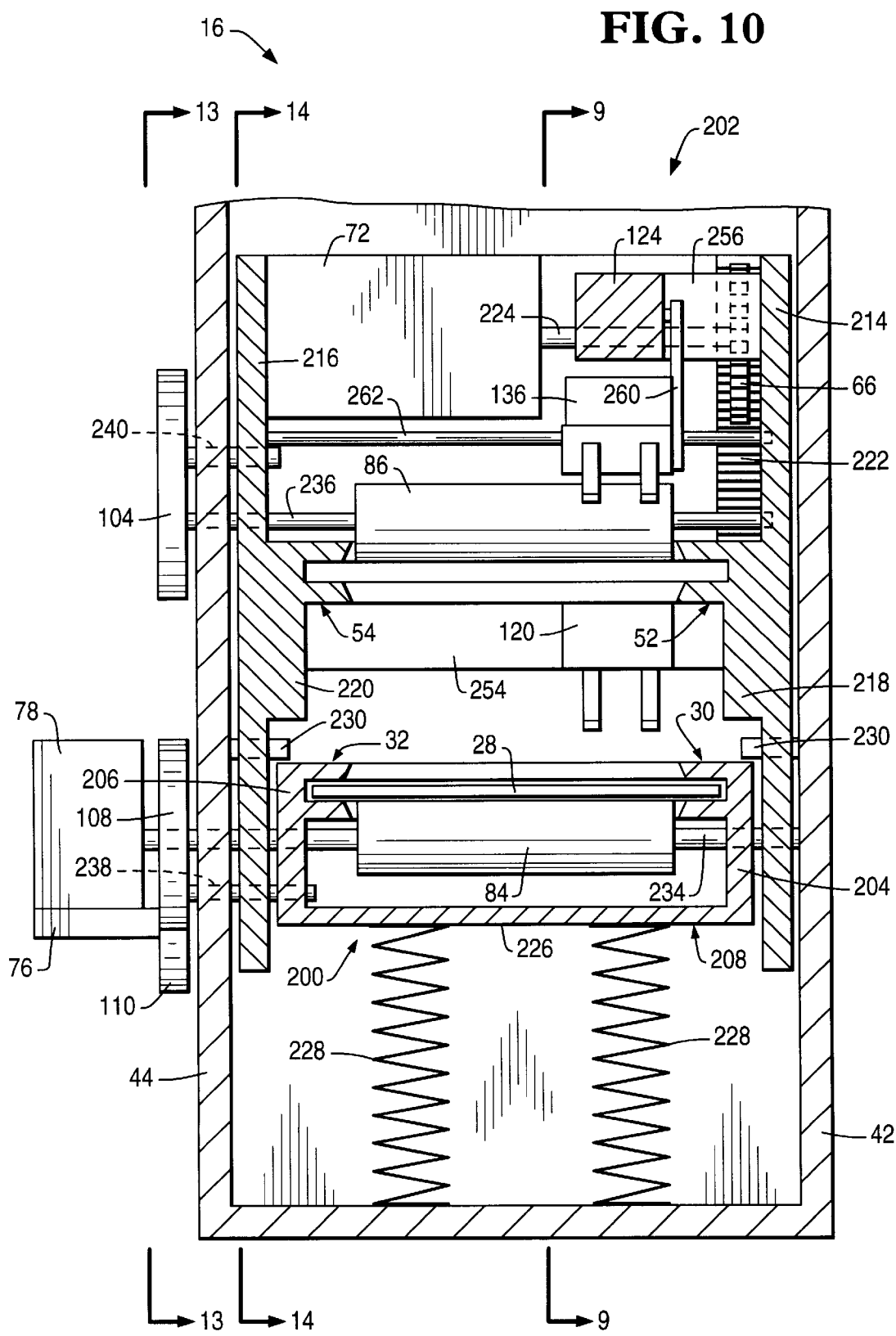

Referring to FIG. 10, roller 84 is on a shaft 234 and roller 86 is on a shaft 236, where shaft 234 is supported by the side members 204,206 of the U-shaped tray 208 of the first card receiving unit 200, and shaft 236 is supported by the vertical members 214,216 of the second card receiving unit 202. Also passing through wall 44 are shafts 238,240; the former being supported by the side member 206, and the latter being supported by the vertical member 216. These shafts 238,240 are between the shafts 234,236 of the respective rollers 84,86, and the ends of the first and second card receiving units 200,202 adjacent wall 210.

Figure 13:
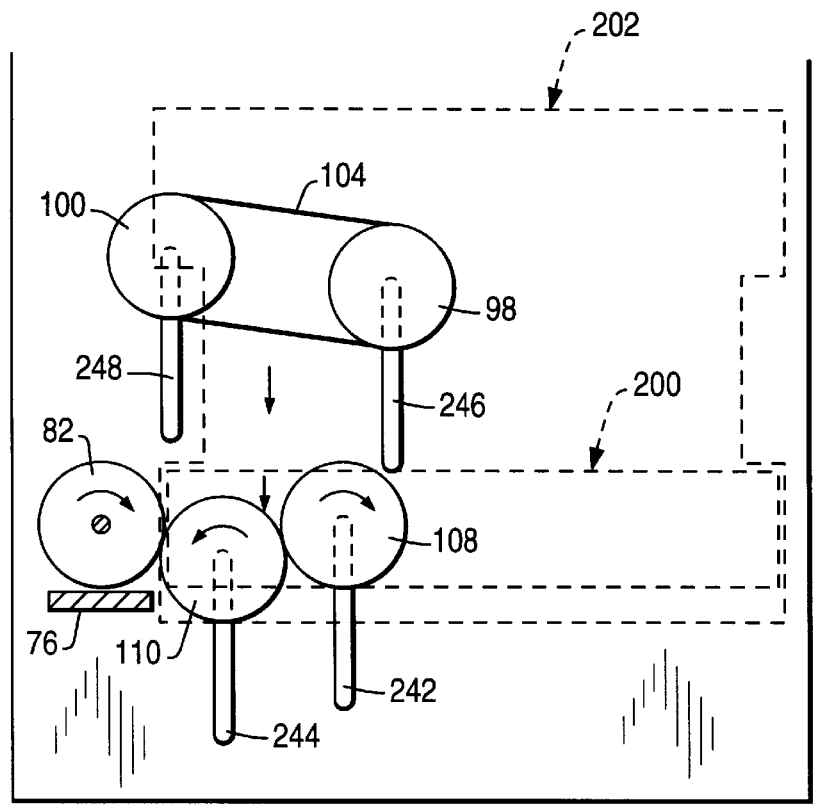
FIGS. 13 and 14 are other sectional views of the second embodiment of a card reading apparatus wherein the card reading apparatus is shown in a position to receive a first card.

As will be seen most clearly from FIG. 13 (where all shafts have been omitted for clarity), there is a slot 242 in wall 44 through which one end of shaft 234 passes through. At the end of the shaft 234 is mounted wheel 108. At the end of shaft 238 is mounted wheel 110 where shaft 238 passes through wall 44 via another slot 244. Wheel 110 is adjacent wheel 108.

There is also a slot 246 in wall 44 through which one end of shaft 236 passes through. At the end of the shaft 236 is mounted wheel 98. At the end of shaft 240 is mounted wheel 100 where shaft 240 passes through wall 44 via another slot 248. Wheel 98 is connected to wheel 100 by a belt 104.

Figure 14:
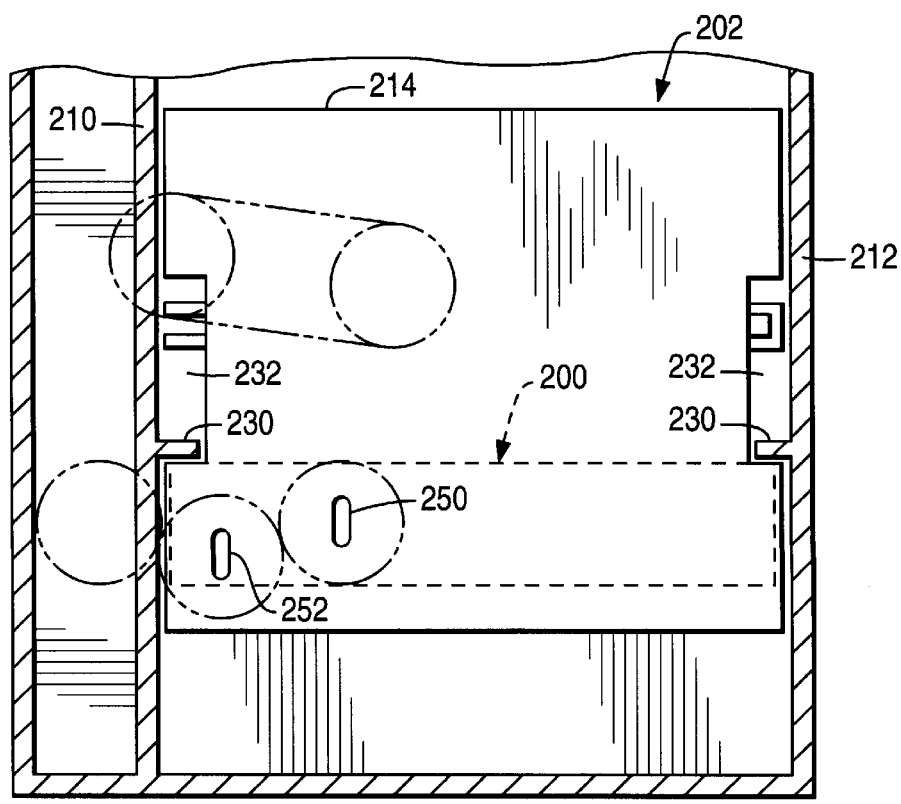

Referring additionally to FIG. 14, shafts 234,238 also pass through respective slots 250,252 in vertical member 216 of the second card receiving unit 202.

As will be clearly seen from FIGS. 13 and 14, slots 242,244,246,248,250,252 are vertical, and are provided to enable the first and second card receiving units 200,202 to move from the first card receiving position to the second card receiving position. Thus the shafts 236,240,234,238 of the respective wheels 98,100,108,110 can be moved between the two card receiving positions.

The arrangement of wheels and rollers are similar to that described in the first embodiment. Thus, when the first card is inserted, wheel 82, associated with roller 74, causes roller 84 to rotate by means of wheels 110,108, and when the second card is inserted, wheel 82 causes roller 86 to rotate by means of wheels 100,98 and belt 104.

As will be seen most clearly from FIG. 9, below the second pair of guides 52,54 is mounted a member 254 spanning between the two vertical members 214,216. Fixed to this member 254 is a contact block 120.

Above the second pair of guides 52,54 is a solenoid 124. This is fixed to the vertical member 214 via connecting members 256,258 (see FIGS. 10 and 11). The arm 128 of the solenoid 124 is connected via another arm 260 to a contact block 136 where arm 260 rotates around a shaft 262 that spans between the two vertical members 214,216.

Figure 11:
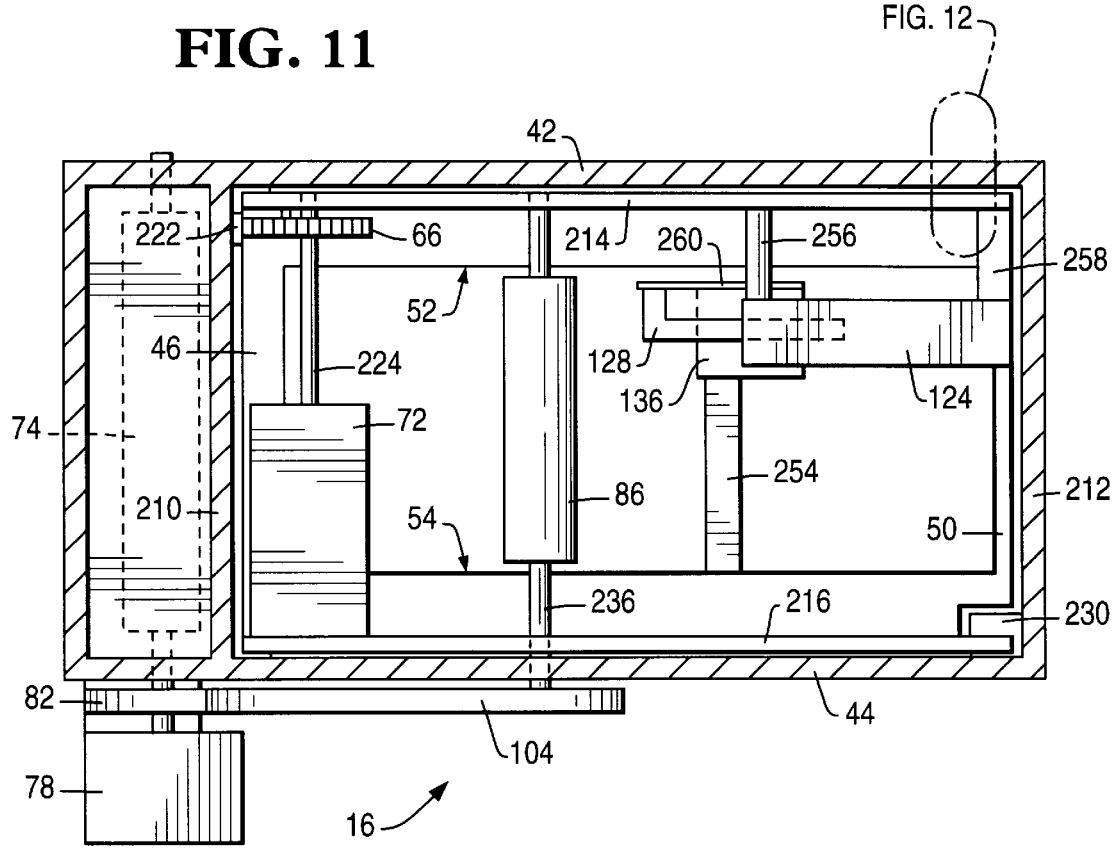

FIGS. 9 to 11 shows the first and second card receiving units 200,202 in their initial positions. As will be clearly seen from FIG. 9, card 28 inserted in slot 18 is transported by rollers 74,84 into the first pair of guides 30,32.

Once the card 28 has been transported into the guides 30,32 the second card receiving unit 202 is lowered so that the second pair of guides 52,54 are aligned with the card insert slot 18 to receive a second card 56 as shown in FIGS. 15 and 16. The lowering of the unit 202 is caused by motor 72 rotating the cog wheel 66 which is engaged with rack 222. This causes the second card receiving unit 202 to push down the first card receiving unit 200 compressing the helical springs 228.

When the first and second card receiving units 200,202 are lowered the springs 144 (see FIG. 8) of the contact block 120 are pressed against the first inserted card 28.

A second card 56 is inserted into slot 18 and is transported by rollers 74,86 into the second pair of guides 52,54.

Once the second card 56 has been received into the second pair of guides 52,54, solenoid 124 is activated causing contact block 136 to be lowered so that its springs 144 make contact with the card 56.

The two smart cards 28,26 are now correctly positioned in the two units 200,202 of the card reading apparatus 16 with the contact blocks 120,136 linking the two cards 28,56 together via the data processing means 24. Thus the transfer of funds from the first card 28 to the second card 56 can now take place.

Once the transfer is complete the solenoid 124 is deactivated causing contact block 136 to be raised back to its original position and the second smart card 56 is returned by the rollers 74,86 to the user. The card receiving units 200,202 are raised back to their original positions as shown in FIG. 9 and the first smart card 28 is returned by the rollers 74,84 to the user.

An alternative to having a stop 50 at one end of the pairs of guides 34,36,50,52 is to have another pair of spans similar to spans 46,48 whereby a card can be passed between the two spans and further into the terminal 10. For example, if a card is rejected it may be transported into a purge bin instead of being returned to the user. Light sensors would indicate when each card inserted is correctly placed. There would be sufficient contact between the cards, the rollers and the contact blocks to hold the cards in place during movement of the card reading apparatus 16. However, the apparatus connected to contact block 120 would need to be arranged differently so that contact block 120 engages the first card 28 and holds it securely in place before the card reading apparatus 16 is moved into the position to receive the second card 56.

It is also possible in either embodiment to transfer funds from the second smart card 56 to the first smart card 28.

The card reading apparatus 16 can also be adjusted to enable information to be transferred between a smart card and a magnetic stripe card when one of the two contact blocks 120,136 is replaced by a suitable magnetic read/write head.

It should be noted that the card reading apparatus 16 of either embodiment can be used to read a single smart card. It is possible for a transfer of funds to take place between an account on the host computer 26 (see FIG. 2) and an account on a single smart card inserted into the card reading apparatus 16.

The self-service terminal 10 can also be adapted to dispense cash where the amount of cash required can be deducted from the account stored on a smart card inserted in the card reading apparatus 16. The terminal 10 can be adapted to receive cash deposits where the value of the deposit can be added to the account stored on an inserted smart card.

What is claimed is:

1. A card reading apparatus for receiving first and second information carrying cards, the card reading apparatus comprising:

means defining a single card entry slot for receiving the first and second cards in succession;

movably mounted first and second card guides for receiving the first and second cards and for holding the cards in first and second card reading positions;

control means for moving the first guide into alignment with the card entry slot such that the first card can be fed into the first card reading position, and for moving the second guide into alignment with the card entry slot such that the second card can be fed into the second card reading position;

first and second read/write means cooperatively associated with the first and second cards when the cards are in their reading positions; and data processing means connected to the first and second read/write means such that information can be transferred between the first and second cards.

2. A card reading apparatus according to claim 1, wherein the first and second information carrying cards are smart cards.

3. A card reading apparatus according to claim 1, wherein the first and second card guides rotate about an axis so that each card guide can be aligned with the card entry slot.

4. A card reading apparatus according to claim 3, wherein the first and second card guides are at an acute angle relative to each other.

5. A card reading apparatus according to claim 1, wherein the first and second card guides move linearly so that each card guide can be aligned with the card entry slot.

6. A self-service terminal for allowing a user to transfer information between first and second information carrying cards, the self-service terminal comprising:

means defining a single card entry slot for receiving the first and second cards in succession;

movably mounted first and second card guides for receiving the first and second cards and for holding the cards in first and second card reading positions;

control means for moving the first guide into alignment with the card entry slot such that the first card can be fed into the first card reading position, and for moving the second guide into alignment with the card entry slot such that the second card can be fed into the second card reading position;

first and second read/write means cooperatively associated with the first and second cards when the cards are in their reading positions; and data processing means connected to the first and second read/write means such that information can be transferred between the first and second cards.

7. A self-service terminal according to claim 6, wherein the first and second information carrying cards are smart cards.

8. A self-service terminal according to claim 6, wherein the first and second card guides rotate about an axis so that each card guide can be aligned with the card entry slot.

9. A self-service terminal according to claim 8, wherein the first and second card guides are at an acute angle relative to each other.

10. A self-service terminal according to claim 6, wherein the first and second card guides move linearly so that each card guide can be aligned with the card entry slot.

* * * * *